United States Patent [19]

Lahoda et al.

[11] Patent Number: 4,584,073
[45] Date of Patent: Apr. 22, 1986

[54] PROCESS AND APPARATUS FOR ISOTOPIC ENRICHMENT USING LASERS

[75] Inventors: Edward J. Lahoda, Edgewood; Herbert A. Burgman, Murrysville; Thomas S. Snyder, Wilkins Township, Allegheny County, all of Pa.

[73] Assignee: Westinghouse Electric Corp., Pittsburgh, Pa.

[21] Appl. No.: 564,060

[22] Filed: Dec. 21, 1983

[51] Int. Cl.[4] .............................................. B01D 59/00
[52] U.S. Cl. .............................. 204/157.2; 204/158 R; 422/186; 204/157.21; 204/157.22
[58] Field of Search .................. 422/186; 204/157.1 R, 204/158 R

[56] References Cited

U.S. PATENT DOCUMENTS

| | | |
|---|---|---|
| 3,567,927 | 3/1971 | Barrington . |
| 3,583,234 | 6/1971 | Moshonas . |
| 4,032,419 | 6/1977 | Bernstein . |
| 4,096,046 | 6/1978 | Neimann . |
| 4,097,384 | 6/1978 | Coleman et al. .............. 204/157.1 R |
| 4,166,951 | 9/1979 | Garbuny . |
| 4,176,024 | 11/1979 | Garbuny ..................... 204/157.1 R |
| 4,247,379 | 1/1981 | Leach . |
| 4,289,592 | 9/1981 | Janner et al. ................. 204/157.1 R |
| 4,381,923 | 5/1983 | Wada ...................... 423/3 |
| 4,389,292 | 6/1983 | Phillips . |
| 4,439,404 | 3/1984 | Porter, II ................. 423/3 |
| 4,487,629 | 12/1984 | Siddall ..................... 204/157.1 R |
| 4,489,102 | 12/1984 | Olmer et al. ................. 204/157.1 R |
| 4,514,363 | 4/1985 | Dubrin ........................ 204/157.1 R |

OTHER PUBLICATIONS

Ambartsumyan, "Dissociation of Molecules . . . ", JETP Letters, vol. 24 (Jul.–Dec. 1976), pp. 256–257.
Karlov, "Selective Evaporation of Frozen Gases . . . ", JETP Letters, vol 24 (Jul.–Dec. 1976), pp. 258–261.

*Primary Examiner*—Edward A. Miller
*Attorney, Agent, or Firm*—R. D. Fuerle

[57] ABSTRACT

A process and apparatus for separating an isotope of an element from other isotopes of the element in a compound, where the compound is deposited as a monolayer on small glass beads, and the coated beads entrained in a carrier gas containing a scavenger gas. The entrained, coated beads are exposed to light from a laser that excites the one isotopic compound and causes reaction thereof with the scavenger gas, to form a reaction product, while the other isotopic compounds remain stable. The other isotopic compounds are then separated from the reaction product and the reaction product removed from the beads to provide the desired isotope.

30 Claims, 1 Drawing Figure

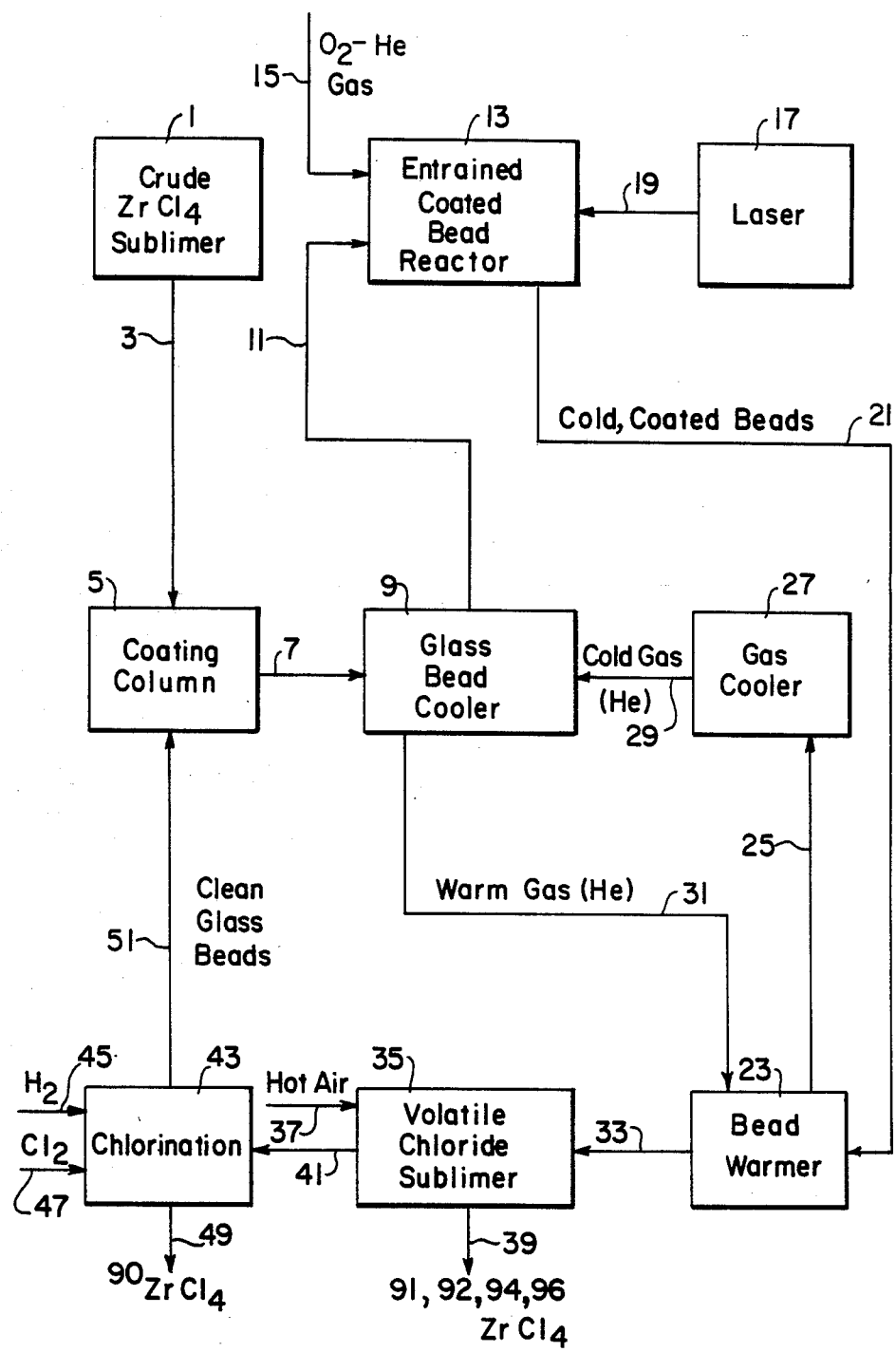

PROCESS AND APPARATUS FOR ISOTOPIC ENRICHMENT USING LASERS

BACKGROUND OF THE INVENTION

The present process relates to an isotopic enrichment process, and an apparatus, where light from a laser is used to excite a compound of one isotope of an element, present as a mixture of isotopic compounds, with reaction of the excited compound with a gaseous scavenger effected to remove that isotope, while the compounds of the other isotopes remain stable, and separation of the reaction product, formed with the gaseous scavenger, provides for separation of the one isotope from the other isotopes.

The separation of, or enrichment of, an isotope of an element relative to other isotopes of the element is desired where one isotope possesses certain properties that are not possessed by other isotopes of the element. In the case of zirconium, for example, naturally occurring zirconium contains a mixture of zirconium isotopes; zirconium 90, zirconium 91, zirconium 92, zirconium 94, and zirconium 96. In the use of zirconium in cladding for nuclear fuel rods the zirconium 90 isotope has a lower capture cross-section for thermal neutrons. It is thus desired to form such cladding from zirconium which has a high zirconium 90 isotope content, higher than the 51.5 percent content of zirconium 90 present in naturally occurring zirconium.

The isotopic enrichment of elements by the use of laser techniques is known. Such techniques generally use lasers in conjunction with a carrier gas to transport and cool a compound of an element to be enriched. Such a process, however, has many practical and economic difficulties. For example, a compound containing the element to be enriched must have a high vapor pressure and, furthermore, the compound must be produced at a reasonable cost. Also, due to nucleation problems induced when the carrier gas is cooled in a supersonic nozzle, the concentration of the element to be enriched must be kept very low. It follows, then that very large compressors are required for handling the carrier gas, resulting in high capital and operating costs. In addition, the low concentration of active element makes it very difficult to use a significant portion of the laser beam due to the nozzle manufacturing difficulties and losses in mirrors and windows. In addition to the above difficulties, the use of a scavenger-type reaction where the isotope of interest is selectively excited and reacted with a scavenger gas is all but ruled out because the gas is cooled in a supersonic nozzle. Thus, the outlet gas has very few molecular collisions and the likelihood of a scavenger-excited molecule collision is very low.

As examples of recent laser-induced isotope separation processes, U.S. Pat. No. 4,032,419 teaches a process to separate U-235 from U-238 in a compound, where the compound is irradiated, in crystalline form of the solid phase, at a first frequency to excite the U-235 but not the U-238. The compound is then irradiated, in crystalline form of the solid phase with a second frequency to dissociate or ionize the U-235, and the irradiated compound is heated to vaporize the U-238 but not the U-235 and separation effected; and U.S. Pat. No. 4,166,951, which is assigned to the assignee of the present invention, teaches a process wherein isotope enrichment is effected by depositing a material on a substrate, at less than a critical subatomic surface density, and selectively irradiating the deposit by a laser to excite one isotope causing the isotope to escape from the substrate, with the escaping enriched material collected.

SUMMARY OF THE INVENTION

The separation of an isotope of an element from a mixture with other isotopes of the element is carried out with a compound of the element irradiated while in the form of a monolayer on particulate transparent beads, and an apparatus for effecting said separation provided.

A plurality of discrete small head particles, which are transparent at a predetermined wavelength, are coated with a monolayer of a compound containing a mixture of isotopes, and the coated beads entrained in a carrier gas containing a scavenger gas for one of the isotopes. The entrained, coated beads are then exposed to light, of a wavelength that will excite one of the isotopic compounds and cause reaction thereof with the scavenger gas, while the other isotopic compounds remain stable. The reaction product, formed by reaction of the excited isotope and the scavenger gas is then separated from the other isotopic compounds.

BRIEF DESCRIPTION OF THE DRAWING

The drawing illustrates schematically the process and apparatus for carrying out the present process, with the separation of zirconium isotopes effected.

DETAILED DESCRIPTION

In accordance with the present invention, small bead particles are coated with a monolayer of a compound containing a plurality of isotopes of an element and the coated beads entrained in a carrier gas containing a gaseous scavenger. Upon irradiation of the coating on the beads, one of the isotopic compounds of the mixture is excited and reacts with the scavenger to form a reaction product that is then separated from the other stable isotopic compounds on the beads.

In the initial step of the process, a plurality of small, discrete bead particles are coated with a monolayer of a compound containing a mixture of isotopes of an element. The beads are formed of a material that is inert to the compound to be treated, as well as to the scavenger to be used, and must be transparent to light at the wavelength that is to be used to excite one of the isotopic compounds. Glass beads are usable, with silicon dioxide beads being preferred. The bead particles are of a size that will enable coating thereof with a monolayer of the compound to be treated while also being entrainable in a carrier gas for transportation through a reactor for excitation of one of the isotopic compounds by light. The bead particles should have a diameter no greater than about 1 micron. Bead particles of a diameter of between 0.1-1.0 micron would be preferred.

The small, discrete bead particles are coated with a monolayer of the compound that is to be treated, such as by heating a supply of the volatile compound to its sublimation temperature and sublimating the compound into a column containing the beads, where the compound will form a monolayer of a coating on the beads. The term monolayer as used herein defines a coating that consists of a single layer of molecules of the compound on a bead. The use of coated transparent beads, having a monolayer of the compound to be treated thereon, enables the use of light in a later stage of the process to excite one of the isotopic compounds.

The compound to be treated is one which contains a plurality of isotopic elements, one of which isotopes is desirably separated. The present invention, while specifically referring to zirconium isotopes is also usable in the separation of other isotopic elements, such as uranium, boron, or the like. Specific compounds of these elements that may be treated according to the process include those compounds in which one of the isotopes is excitable at a particular wavelength of light, to react with a gaseous scavenger, where the other isotopes remain stable. For zirconium, a particularly useful compound is zirconium tetrachloride ($ZrCl_4$), because of its volatility. Examples of useful boron compounds include boron methoxide [$B(OCH_3)_3$] and boron ethoxide [$B(OC_2H_5)$], while an example of a usable uranium compound would be uranium hexafluoride ($UF_6$).

After coating of the beads with a monolayer of the compound containing the isomers, the beads, which are hot, are preferably cooled to at least ambient temperatures. The coated beads are then entrained in a carrier gas containing a gaseous scavenger and charged to an entrained coated bed reactor for irradiation by a light source.

The carrier gas is one which is inert to the reactions of the compound and inert to the bead particles, such as helium, neon, argon and krypton. Helium is a preferred carrier gas. The amount of the carrier gas and the flow rate thereof should be that sufficient to entrain the coated beads and carry the same through the reactor as discrete units, while maintaining the coated beads in the reactor for a time sufficient to effect excitation and reaction of one of the isotopes with the scavenger gas and cause reaction therebetween to form a reaction product.

The scavenger gas that is charged to the entrained coated bead reactor, along with the carrier gas, comprises a gas that will react with the excited isotopic compound within the reactor to form a reaction product, while reaction is not effected between the scavenger gas and the remainder of the isotopic compounds under the conditions present in the reactor. As examples of scavenger gases, water, oxygen and methane are preferred. In the case of water, oxides or hydroxides would be formed; while in the case of oxygen, oxides would be formed; and in the case of methane, carbides would be formed, as the reaction product. The scavenger gas should be present in an amount at least sufficient to react with all of the excited isotopic compounds and form a reaction product therewith.

The coated beads, while entrained in the carrier gas and in the presence of a gaseous scavenger, are exposed to light of a wavelength that causes reaction of one of the isotopes with the scavenger while the other isotopes in the mixture will remain stable. The light of the particular wavelength is emitted from a laser. The laser to be used will depend upon the wavelength of the light and the intensity required for excitation. A laser having an intensity of between 1-5 Joules/$cm^2$ is usable, with a preferred intensity being between 1.5-2 Joules/$cm^2$. The wavelength of the light is dependent upon the excitation wavelength required and will vary dependant upon the compound being treated. As an example, in the separation of a zirconium 90 isotope from other zirconium isotopes in a zirconium tetrachloride compound, a wavelength between 400-500 $cm^{-1}$ would be used, such as that produceable by a carbon dioxide, Raman shifted laser.

The time of exposure of the coated beads to the light is that sufficient to effect excitation of the desired isotopic compound with the gaseous scavenger, and after reaction of the isotopic compound with the scavenger, the coated beads are discharged from the entrained coated bead reactor and the reaction product separated from the other isotopic compounds, which latter have remained in a stable condition. The coated beads, at this stage of the process are coated with a mixture of the reaction product and the other stable isotopic compounds.

In order to effect ready separation of the reaction product from the other stable isotopic compound, it is advantageous, as in the example of zirconium 90 tetrachloride excitation, in admixture with other isotopes of zirconium tetrachloride, and reaction of the zirconium 90 isotope with oxygen to form zirconium dioxide, if the reaction product is less volatile than the remaining stable compound. The coated beads are then passed to a bead warmer and separated from carrier gas, which carrier gas is recyclable to the system, such as to the glass bead cooling step, after cooling of the carrier gas. The coated glass beads are then charged to a volatile sublimer, where, upon heating, such as by hot air, the volatile compound will volatilze off of the beads, while the less volatile reaction product is retained on the beads. Thus, separation of the other stable isotopic compounds is effected, and these isotopic compounds are collected.

The coated beads, after separation of the other stable isotopic compounds therefrom, have only the reaction product retained thereon. These beads are then treated so as to remove the reaction product therefrom, and are recyclable to the process for additional coating with the compound to be treated, and reuse. In the separation of zirconium isotopes, for example, the coated beads as previously described, after removal of the volatile tetrachlorides, would retain only zirconium 90 dioxide thereon. The beads, coated with zirconium 90 dioxide, are subjected to a system where hydrogen and chlorine are reacted with the zirconium dioxide to produce a volatile zirconium 90 tetrachloride. Upon heating of the beads, the zirconium 90 tetrachloride will sublime from the beads to give a zirconium 90 tetrachloride product, while the clean beads are recycled to the process.

The apparatus, according to the present process, for separation of one isotope from other isotopes in a compound, includes a means for coating discrete bead particles, that are transparent at the desired wavelength, such as a bead coating column, and means for entraining the coated beads in a carrier gas containing a scavenger gas for an excited isotope. A light source, such as a laser, directs light, at the desired wavelength, into a reaction vessel, such that an isotopic compound therein is excited and reacts with the scavenger gas, while the other isotopic compounds remain stable. A separator is also provided so as to separate the reaction product from the remaining stable isotopic compounds, which separator can comprise a bead warmer and sublimation vessel to remove volatile compounds.

In the attached drawing, an embodiment of the present process is schematically illustrated in connection with the separation of zirconium 90 from other zirconium isotopes. As illustrated, zirconium tetrachloride 1, containing zirconium 90, zirconium 91, zirconium 92, zirconium 94 and zirconium 96 isotopes is heated to sublime the same and the sublimed compound passed through line 3 to a coating column 5 which contains discrete bead particles, such as silicon dioxide beads, where the compound coats the beads as a monolayer of zirconium tetrachloride on the beads. The hot coated beads pass through line 7 to a glass bead cooler 9 where the coated beads are cooled to provide a supply of cool beads coated with a monolayer of zirconium tetrachloride. The cooled, coated beads then are passed through line 11 to an entrained coated bead reactor 13. In the entrained coated bead reactor 13, the cool, coated beads are entrained in a carrier gas, such as helium, containing a scavenger gas, such as oxygen, the gases charged to the coated bead reactor 13 through line 15. While entrained in the carrier gas stream, and in contact with the scavenger gas, the cooled coated beads with the monolayer of zirconium tetrachloride thereon, are subjected to irradiation by light from a laser 17, the beam of light 19 from the laser 17 having a wavelength that will excite the zirconium 90 tetrachloride and cause reaction thereof with the scavenger, oxygen, while the other zirconium isotope tetrachloride remains stable on the beads. After a period of time in the entrained coated bead reactor to effect excitation of the zirconium 90 tetrachloride and reaction thereof with the scavenger, the cold coated beads entrained in the carrier gas are discharged through line 21 to a bead warmer 23. In the bead warmer 23, the carrier gas is separated from the coated beads, which are now coated with a mixture of zirconium 90 dioxide and other zirconium isotope tetrachloride. The separated carrier gas is passed through line 25 to a gas cooler 27, and after sufficient cooling is passed through line 29 to the glass bead cooler and is used to cool further glass beads therein. The carrier gas in bead cooler 9 will be warmed by contact with further hot, coated, glass beads, and is recycled through line 31 back to the bead warmer 23 to warm further coated beads. The warm coated glass beads, having a layer of zirconium 90 dioxide and other zirconium isotope tetrachloride, are passed through line 33 to a volatile chloride sublimer 35 where the coated beads are heated by hot air introduced through line 37. In the volatile chloride sublimer 35, the beads are heated to a temperature sufficient to sublime the zirconium tetrachloride from the beads and the zirconium tetrachloride, containing zirconium 91, zirconium 92, zirconium 94 and zirconium 96, is discharged through line 39 and collected, leaving the hot beads coated only with zirconium 90 dioxide. The hot coated beads, now coated only with zirconium 90 dioxide are then passed through line 41 to chlorination system 43. In the chlorination system, the hot beads coated with zirconium 90 dioxide, are contacted with hydrogen from line 45 and chlorine from line 47, so as to convert the zirconium 90 dioxide to zirconium 90 tetrachloride. The zirconium 90 tetrachloride, as it is formed, is sublimed from the hot beads and is discharged through line 49 for collection as product. The hot beads, which no longer have any coating thereon are recycled through line 51 for use in the coating column 5 for coating with further crude zirconium tetrachloride, and reuse in the isotope separation system.

There has been described a process and apparatus for separating an isotope of an element from other isotopes where a compound containing the isotopes is coated on beads and the compound irradiated by a laser to excite one of the isotopes and cause reaction with a gaseous scavenger. The excitation of the isotopic compound in a solid phase, as a monolayer on the beads, avoids problems associated with laser excitation of isotopes in a gaseous state.

What is claimed is:

1. A process for the separation of a first isotope of an element from other isotopes of the element, wherein said isotopes are present as a mixture in an isotopic compound, and wherein one of said isotopic compounds is excitable by light at a wavelength where the other said isotopic compounds remain stable, comprising:
   coating a plurality of discrete, small bead particles, which particles are transparent at said wavelength, with a monolayer of said mixture of isotopic compound;
   entraining said plurality of coated particles in a carrier gas containing a scavenger gas for an excited one of said isotopic compounds;
   exposing said plurality of coated particles, while so entrained to light, to excite one of said isotopic compounds and cause reaction thereof with said scavenger gas and form a reaction product, while said other isotopic compounds remain stable; and
   separating said reaction product from said other isotopic compounds.

2. The process as defined in claim 1 wherein said discrete, small bead particles comprise silicon dioxide beads having a diameter no larger than one micron.

3. The process as defined in claim 1 wherein said carrier gas is selected from the group consisting of helium, neon, argon, and krypton.

4. The process as defined in claim 1 wherein said scavenger gas is selected from the group consisting of methane, oxygen, and water.

5. The process as defined in claim 1 wherein after separating said reaction product from said other isotopic compounds, the beads, after removal of both the reaction product and other isotopic compounds, are recycled for further coating thereof.

6. The process as defined in claim 1 wherein said reaction product is less volatile than the other isotopic compounds and wherein said separating is carried out by volatilizing off the other isotopic compounds from the beads while said reaction product is retained on said beads.

7. The process as defined in claim 6 wherein said retained reaction product is removed from said beads and the beads are recycled for further coating thereof.

8. The process as defined in claim 1 wherein said element is selected from the group consisting of zirconium, uranium, and boron.

9. The process as defined in claim 8 wherein said element is zirconium and said compound is zirconium tetrachloride.

10. The process as defined in claim 8 wherein said element is uranium and said compounds is uranium hexafluoride.

11. The process as defined in claim 8 wherein said element is boron and said compound is selected from the group consisting of boron methoxide and boron ethoxide.

12. A process for the separation of the zirconium 90 isotope from other zirconium isotopes, wherein the same are present as a mixture in an isotopic compound, and wherein the zirconium 90 isotopic compound is excitable by light at a wavelength where the other zirconium isotopic compounds remain stable, comprising:
   coating a plurality of discrete, small bead particles, which particles are transparent at said wavelength, with a monolayer of said mixture of zirconium isotopic compound;

entraining said plurality of coated particles in a carrier gas containing a scavenger gas for an excited zirconium 90 compound;

exposing said plurality of coated particles, while so entrained, to light, to excite said zirconium 90 isotopic compound and cause reaction thereof with said scavenger gas and form a zirconium 90 reaction product, while said other zirconium isotopic compounds remain stable; and separating said zirconium 90 reaction product from said other zirconium isotopic compounds.

13. The process as defined in claim 12 wherein said discrete, small bead particles comprise silicon dioxide beads having a diameter no larger than one micron.

14. The process as defined in claim 12 wherein said carrier gas is selected from the group consisting of helium, neon, argon, and krypton.

15. The process as defined in claim 12 wherein said scavenger gas is selected from the group consisting of methane, oxygen, and water.

16. The process as defined in claim 12 wherein said zirconium 90 reaction product is less volatile than the other zirconium isotopic compounds and wherein said separating is carried out by volatilizing off the other zirconium isotopic compounds from the beads while said reaction product is retained on said beads.

17. The process as defined in claim 16 wherein said zirconium compound is zirconium tetrachloride, said scavenger gas is oxygen, and said zirconium 90 reaction product is zirconium 90 hydroxide.

18. The process as defined in claim 17 wherein said carrier gas is helium.

19. The process as defined in claim 16 wherein, after volatilizing off the other zirconium isotopic compounds, the reaction product is removed from said beads and said beads are then recycled for further coating thereof.

20. The process as defined in claim 19 wherein said reaction product is removed from said beads by chemical reaction with a substance which forms a volatile compound and said volatile compound is volatilized from said beads.

21. An apparatus for use in separating one isotope of an element from other isotopes of the element wherein the isotopes are present as a mixture in an isotopic compound, and where one of said isotopic compounds is excitable by light at a wavelength where the other isotopic compounds remain stable comprising:

means for coating discrete, small bead particles, which particles are transparent at said wavelength, with a monolayer of said mixture of isotopic compound;

means for entraining the coated bead particles with a carrier gas containing a scavenger gas for an excited one of said isotopic compounds;

a reaction in which said coated entrained beads are charged;

a light source directing light of said wavelength onto said coated entrained beads in said reaction vessel, whereby one of said isotopic compounds is excited by said light and reacts with said scavenger gas to form a reaction product, while the other isotopic compounds remain stable; and means for separating said reaction product from said other isotopic compounds.

22. The apparatus as defined in claim 21 including means for cooling said coated bead particles prior to passage thereof to said means for entraining.

23. The apparatus as defined in claim 22 wherein said means for separating said reaction product from said other isotopic compounds comprises means for heating said coated beads to volatilize said reaction product therefrom.

24. The apparatus as defined in claim 21 including means for recycling carrier gas from said means for heating to said means for cooling.

25. A process as defined in claim 1 wherein said bead particles are glass.

26. A process as defined in claim 1 wherein said bead particles have a diameter of about 0.1 to about 1.0 microns.

27. A process as defined in claim 1 wherein said light has an intensity of about 1 to about 5 Joules/$cm^2$.

28. A process as defined in claim 27 wherein said light has an intensity of about 1.5 to about 2 Joules/$cm^2$.

29. A process as defined in claim 9 wherein said light has a wavelength of about 400 to about 500 $cm^{-1}$.

30. The apparatus as defined in claim 21 wherein said light source is a carbon dioxide, Raman shifted laser.

* * * * *